(No Model.)
H. PRAY.
POTATO DIGGER.
No. 502,998. Patented Aug. 8, 1893.
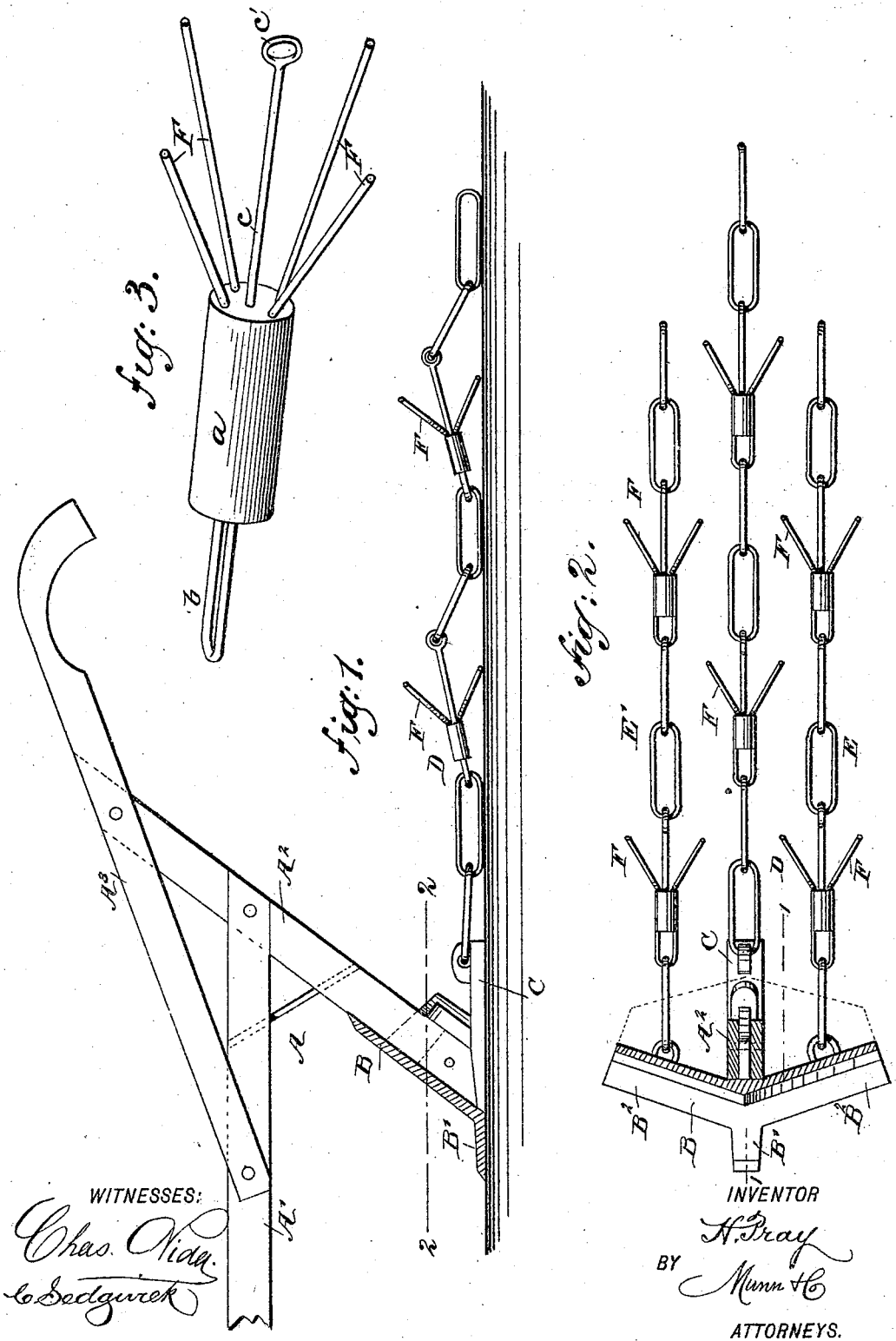
WITNESSES:
Chas. Vida.
C. Sedgwick.
INVENTOR
H. Pray
BY
Munn & Co.
ATTORNEYS.

United States Patent Office.

HAMILTON PRAY, OF CLOVE, NEW YORK.

POTATO-DIGGER.

SPECIFICATION forming part of Letters Patent No. 502,998, dated August 8, 1893.

Application filed February 15, 1893. Serial No. 462,512. (No model.)

*To all whom it may concern:*

Be it known that I, HAMILTON PRAY, of Clove, in the county of Dutchess and State of New York, have invented a new and Improved Potato-Digger, of which the following is a full, clear, and exact description.

The object of the invention is to provide a new and improved potato digger, which is simple and durable in construction, and arranged to easily plow up the potatoes and keep the same on the surface of the ground, without danger of the potatoes becoming covered up in the furrow by the loose, rolling earth.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement on the line 1—1 of Fig. 2. Fig. 2 is a sectional plan view of the same on the line 2—2 of Fig. 1, and Fig. 3 is a perspective view, on an enlarged scale, of one of the agitator links of the chain.

The improved potato digger is provided with a plow A of any approved construction and having a plow frame composed of the usual plow beam A', the post $A^2$, and the handles $A^3$.

On the lower end of the plow post $A^2$ is secured a suitable plow share B formed with a point B' and side flanges $B^2$ extending at an obtuse angle in opposite directions and rearwardly, as plainly shown in Fig. 2.

On the lower end of the plow post $A^2$ and in the rear of the plow share B is arranged a shoe C adapted to travel in the bottom of the furrow made by the plow point B'. On this shoe C is secured the forward end of a drag D made in sections or links loosely connected with each other, so that the drag travels in the furrow made by the forwardly-moving plow. Similar drags E and E' may be arranged longitudinally and parallel to the drag D, the said drags E and E' being secured to the back of the plow share, as plainly shown in the drawings.

As illustrated each drag D, E or E', is made in the shape of a chain of a suitable length, say about nine feet, and several of the links in each chain are formed with prongs F to constitute an agitator or whirl adapted to turn as the chain is dragged along, caused by the prongs coming in contact with the irregular ground. The links provided with prongs are each formed of a body $a$, preferably cylindrical, provided at one end with the eye $b$ and at its other end with the prongs F and the central rod $c$ having an eye $c'$ at its end, said eye being at right angles to the eye $b$. Now, it will be seen that when the plow is moved forward and the earth is plowed up by the share, then the potatoes are kept on the surface of the ground in the furrow by the drags D, E, E', as the said drags pack the earth firmly, but hold lighter, loose material, such as potatoes on the top surface, hence preventing covering up the potatoes which thus remain on the surface of the ground. It will be seen that the whirls hold the next following links in an angular position, thus giving the earth room to settle and pack sufficiently to prevent covering up of the potatoes by the loose rolling earth. The whirl also has the tendency to throw the potatoes farther out to the sides of the furrow. The individual links or joints of each drag are made sufficiently open to permit the earth to readily pass through the openings in the links so that the side bars thereof readily pack the earth and at the same time hold the lighter articles, such as the potatoes on the surface of the ground.

Having thus fully described my invention, I claim as new and desire to secure by Letters Patent—

1. In a drag chain for potato diggers, a link formed of a body provided at one end with an eye and at its other end with prongs and a central rod having an eye, substantially as described.

2. In a potato digger, a chain formed of ordinary links, and one or more links formed of a body provided at one end with an eye and at its other end with prongs and a central rod having an eye at its end, said eye being at right angles to the eye at the other end of the body, substantially as herein shown and described.

3. In a potato digger, the combination with a plow share having lateral wings or flanges, and a rearwardly extending shoe, of drag chains secured to the wings of the share and shoe, each chain being formed of ordinary links and one or more links formed of a body provided at one end with an eye and at its other end with prongs and a central rod having an eye at its end, said eye being at right angles to the eye at the other end of the body, substantially as herein shown and described.

HAMILTON PRAY.

Witnesses:
ANDREW BOWDISH,
GEORGE E. DALEY.